July 6, 1926. 1,591,347
F. L. VAN ALLEN
CONVEYER FOR HANDLING FLAX PLANTS AND THE LIKE
Filed August 2, 1921  2 Sheets-Sheet 1
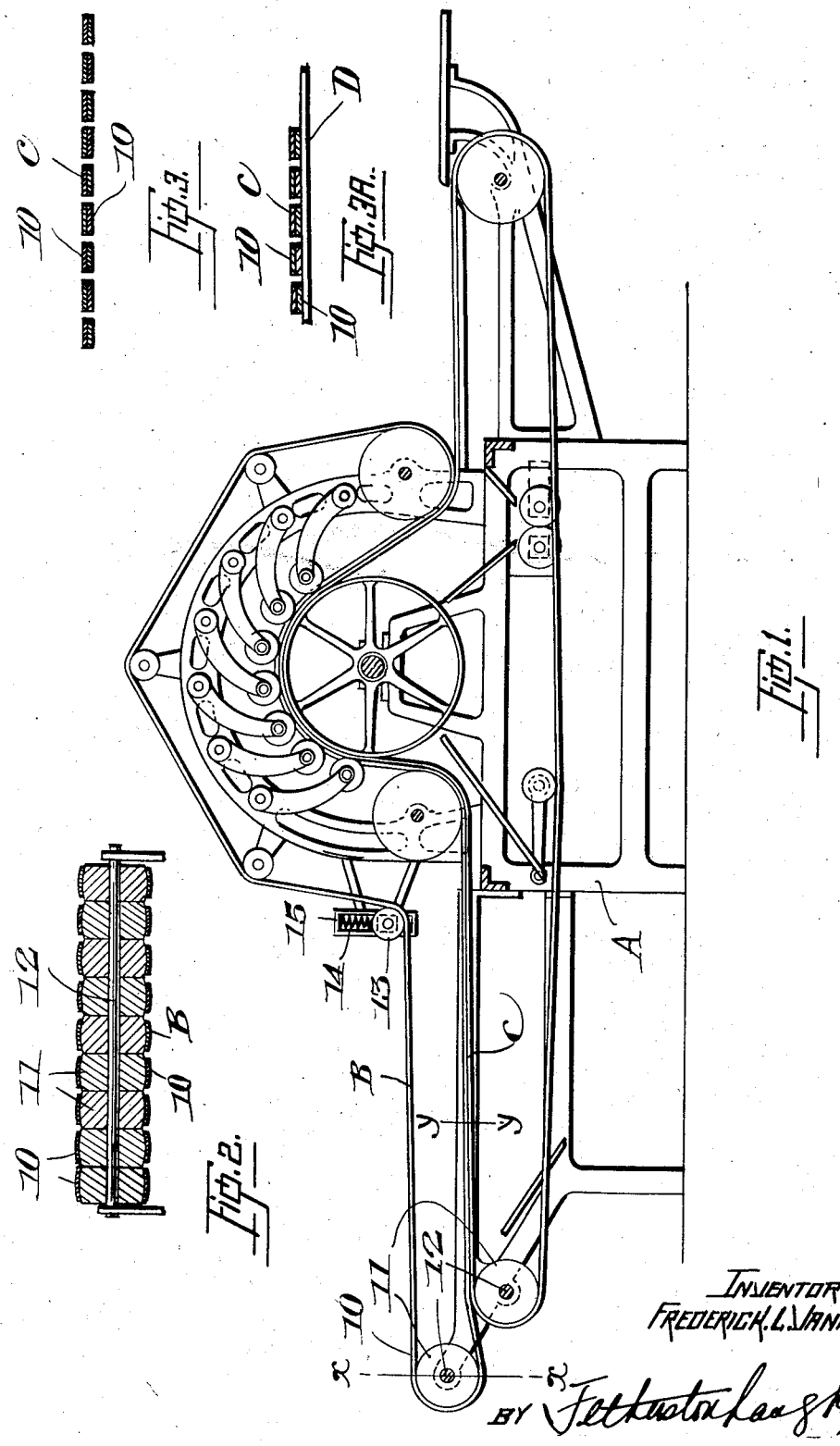
INVENTOR
FREDERICK. L. VAN ALLEN.
BY Fetherston Laughlin
ATTYS.

July 6, 1926.
F. L. VAN ALLEN
1,591,347
CONVEYER FOR HANDLING FLAX PLANTS AND THE LIKE
Filed August 2, 1921    2 Sheets-Sheet 2
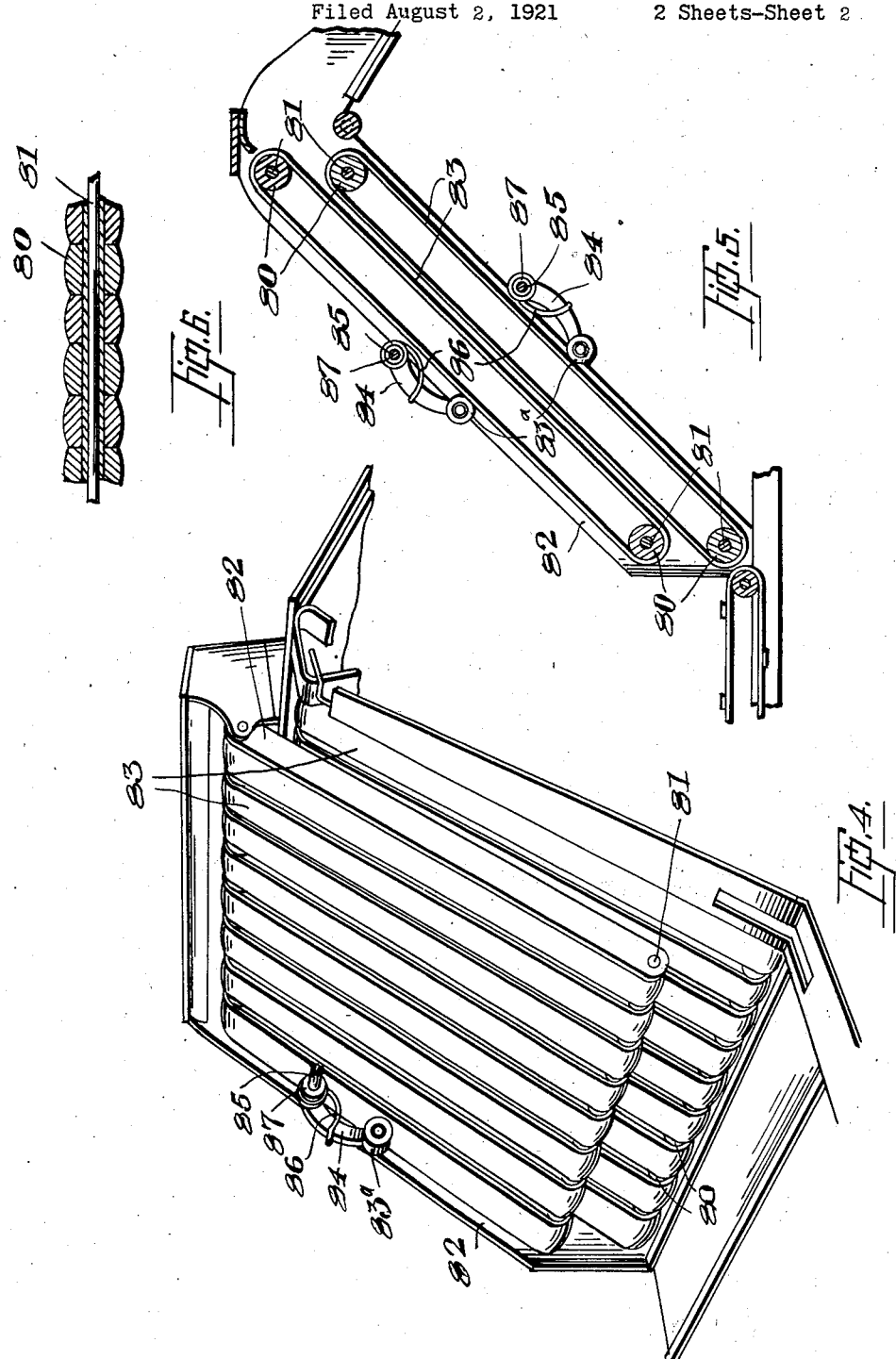
INVENTOR
FREDERICK L. VAN ALLEN.
BY Fetherstonhaugh & Co.
ATT'YS.

Patented July 6, 1926.

1,591,347

UNITED STATES PATENT OFFICE.

FREDERIC LANGTRY van ALLEN, OF GODERICH, ONTARIO, CANADA.

CONVEYER FOR HANDLING FLAX PLANTS AND THE LIKE.

Application filed August 2, 1921, Serial No. 489,385, and in Canada August 3, 1920.

This invention relates to improvements in conveyers for handling flax plants and the like, and the objects of the invention are to provide a simple and effective conveyer which will adjust itself to the varying widths of the plants being conveyed, and will enable the plants to be carried and uniformly fed.

Further objects are generally to improve and simplify conveyers of this type to better adapt them to perform the functions required of them.

For parts of the apparatus not herein illustrated, reference is made to my co-pending application for deseeding flax filed of even date herewith.

The invention consists essentially of the improved construction hereinafter described in detail in the accompanying specification and drawings.

In the drawings:

Figure 1 is a sectional elevation of an embodiment of the apparatus.

Figure 2 is a section on the line $x—x$, Figure 1.

Figure 3 is a section on the line $y—y$, Figure 1.

Figure 3$^A$ is a sectional detail showing an alternative form of the belt arrangement.

Figure 4 is a perspective view of a grain elevator conveyer constructed in accordance with this invention.

Figure 5 is a longitudinal sectional view of the device shown in Figure 4.

Figure 6 is a transverse section through the rollers used in the device shown in Figure 4.

In the drawings, like characters of reference indicate corresponding parts in all the figures.

Referring to the drawings:

A indicates the frame of the machine on which are mounted two travelling belts B and C designed to carry flax while being operated upon by the deseeding means as described in detail in my co-pending application. The mechanism by which the flax is deseeded does not form part of the present invention and will, therefore not be described in the present application. For a complete description thereof, reference is made to my co-pending application filed of even date herewith.

Each of the conveyers B and C consists of a plurality of conveying belts 10, arranged in laterally spaced relation, the belts of one conveyer being designed to contact with the belts of the other conveyer for a portion of their length whereby the flax plants may be held between them and conveyed with the belt.

Each of the belts 10 is supported on a plurality of crowned rollers 11 supported on suitable shafts 12. It will be seen that the crowned rollers maintain the belts in proper alignment and, owing to the fact that there are a number of laterally adjacent and independent belts, each pair of contacting belts is free to accommodate itself to the varied thickness of the flax plants which are conveyed.

Suitable elastic tensioning means may be provided for each of the belts. I have shown, for instance, a tensioning roller 13 held against the belt B by means of a spring 14 supported from a suitable housing 15, but any other convenient tensioning means well known in the art may be used.

The conveyer is not limited in its utility to the particular deseeding means used, but may be used for conveying flax or grain straw, in any kind of apparatus where it is desired to feed flax or grain straw uniformly to accommodate the varying thickness of the plants.

In Figure 3$^A$ I have shown the conveyer supported by a travelling apron or wide belt D.

In the form of the invention shown in Figures 4, 5 and 6, a grain conveyer such as in use in a threshing machine is shown in which a plurality of crowned rollers 80 are mounted on transversely extending spindles 81. Two spindles are used in each conveying element and are journalled in side members 82 so that the spindles are held in spaced relation and endless belts 83 pass over the crowned rollers 80, and each conveying element would have as many belts as there are pairs of crowned rollers, and these belts are arranged laterally separated but adjacent to each other. Each belt will be individually tensioned by suitable means; the means I have shown comprises rollers 83$^a$ mounted on independent arms 84 which are pivoted on a cross-shaft 85 suitably mounted, a spring 86 being connected to a collar 87 on the shaft and to the arm 84 and being adapted to hold the roller 83$^a$ under tension against the belt 83.

The grain is fed to the two endless conveyers by any suitable means and passes up between the adjacent faces of the two sets of belts of the upper and lower conveyer respectively, the grain being held between such adjacent faces and prevented from bunching and becoming displaced, so that it will be carried upwardly on the elevator in the manner best calculated to deliver it in the proper condition at the point at which it is to be discharged.

As many changes could be made in the above construction and many widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:—

An adjustable conveyer of the character described comprising a set of conveyer belts arranged in laterally spaced relationship, a second set of conveyer belts supported in laterally spaced relationship on the first set and having one of the faces of each adjacent to one face of each of the faces of the other and elastic tensioning means including spring actuated rollers for each belt and crowned rollers adapted to carry the belts.

In witness whereof I have hereunto set my hand.

FREDERIC LANGTRY van ALLEN.